US010115960B2

(12) United States Patent
Lee et al.

(10) Patent No.: US 10,115,960 B2
(45) Date of Patent: Oct. 30, 2018

(54) ELECTRODE FOR SECONDARY BATTERY AND MANUFACTURING METHOD THEREOF

(71) Applicants: JENAX INC., Busan (KR); HANBAT NATIONAL UNIVERSITY INDUSTRY-ACADEMIC COOPERATION, Daejeon (KR)

(72) Inventors: Yong Min Lee, Daejeon (KR); Myung-Hyun Ryou, Daejeon (KR); Seonghyun Song, Daejeon (KR); Jaecheol Choi, Daejeon (KR); Chang Hyeon Kim, Chungcheongnam-do (KR)

(73) Assignees: Jenax Inc., Busan (KR); Hanbat National University Industry-Academic Cooperation Foundation, Daejeon (KR)

( * ) Notice: Subject to any disclaimer, the term of this patent is extended or adjusted under 35 U.S.C. 154(b) by 233 days.

(21) Appl. No.: 14/907,155

(22) PCT Filed: Oct. 30, 2014

(86) PCT No.: PCT/KR2014/010311
§ 371 (c)(1),
(2) Date: Jan. 22, 2016

(87) PCT Pub. No.: WO2015/108268
PCT Pub. Date: Jul. 23, 2015

(65) Prior Publication Data
US 2016/0164071 A1 Jun. 9, 2016

(30) Foreign Application Priority Data

Jan. 15, 2014 (KR) .................. 10-2014-0004972
Oct. 29, 2014 (KR) .................. 10-2014-0148783

(51) Int. Cl.
| | | |
|---|---|---|
| H01M 4/04 | (2006.01) |
| H01M 4/38 | (2006.01) |
| H01M 4/66 | (2006.01) |
| H01M 10/0525 | (2010.01) |
| H01M 4/131 | (2010.01) |
| H01M 4/1391 | (2010.01) |
| H01M 4/134 | (2010.01) |
| H01M 4/1395 | (2010.01) |
| H01M 4/80 | (2006.01) |
| H01M 10/052 | (2010.01) |
| H01M 4/74 | (2006.01) |
| H01M 4/02 | (2006.01) |

(52) U.S. Cl.
CPC ......... *H01M 4/0426* (2013.01); *H01M 4/131* (2013.01); *H01M 4/134* (2013.01); *H01M 4/1391* (2013.01); *H01M 4/1395* (2013.01); *H01M 4/38* (2013.01); *H01M 4/386* (2013.01); *H01M 4/387* (2013.01); *H01M 4/661* (2013.01); *H01M 4/662* (2013.01); *H01M 4/74* (2013.01); *H01M 4/806* (2013.01); *H01M 10/052* (2013.01); *H01M 10/0525* (2013.01); *H01M 2004/021* (2013.01); *H01M 2220/10* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| 6,051,335 A * | 4/2000 | Dinh-Sybeldon ..... H01M 2/145 429/142 |
| 2014/0023928 A1 * | 1/2014 | Jeon ...................... H01M 4/364 429/220 |

FOREIGN PATENT DOCUMENTS

| JP | 2002-289181 | 10/2002 |
| JP | 2084-305781 | 12/2008 |
| JP | 2009-537963 | 10/2009 |
| KR | 10-0559364 | 3/2006 |
| KR | 10-0962032 | 6/2010 |
| KR | 10-2012-0131881 | 12/2012 |
| KR | 10-2013-0133624 | 12/2013 |

OTHER PUBLICATIONS

International Search Report dated Feb. 17, 2015 for PCT/KR2014/010311.
Written Opinion of the International Search Report dated Feb. 17, 2015 for PCT/KR2014/010311.

* cited by examiner

*Primary Examiner* — Muhammad S Siddiquee
(74) *Attorney, Agent, or Firm* — Jones Day (57) ABSTRACT

The present invention relates to a battery technology, and more particularly, to a current collector that may be widely used in secondary batteries and an electrode employing the same. The current collector includes a conductive fiber layer including a plurality of conductive fibers. Each of the conductive fibers includes a conductive core consisting of a plurality of metal filaments; and a conductive binder matrix surrounding the outer circumferential surfaces of the conductive core.

11 Claims, 7 Drawing Sheets

FIG. 4A
Step A

FIG. 4B
Step B

FIG. 4C
Step C

ELECTRODE FOR SECONDARY BATTERY AND MANUFACTURING METHOD THEREOF

This application claims the priority of Korean Patent Application Nos. 10-2014-0004972 and 10-2014-0148783, filed on Jan. 14, 2014 and Oct. 29, 2014 in the KIPO (Korean Intellectual Property Office), the disclosure of which is incorporated herein entirely by reference. Further, this application is the National Stage application of International Application No. PCT/KR2014/010311, filed Oct. 30, 2014, which designates the United States and was published in Korean. Each of these applications is hereby incorporated by reference in their entirety into the present application.

TECHNICAL FIELD

The present invention relates to a secondary battery technology, and more particularly, to an electrode for a binder-free secondary battery and manufacturing method thereof.

BACKGROUND ART

A secondary battery is a chargeable and rechargeable battery employing a fine electrode material, where a representative example of commercialization thereof is a lithium secondary battery. The lithium secondary battery is expected to be applied as a small power source for a small IT device, such as a smart phone, a portable computer, and an electronic paper, but also as a mid-sized or large-sized power source mounted on a means of transportation, such as a car, or used in a power storage in a power supply network, such as a smart grid.

If lithium metal is used as an anode electrode material of a lithium secondary battery, the battery may be short-circuited or explode due to formation of dendrite. Therefore, a crystalline carbon, such as graphite or artificial graphite, soft carbon, hard carbon, or a carbon-based active material capable of intercalating and deintercalating lithium is commonly used instead of the lithium metal for an anode electrode. However, as fields of application of a secondary battery expand, it is demanded to further increase capacity and output power of a secondary battery, and thus non-carbon-based anode electrode materials that have capacities of 500 mAh/g or higher and may be alloyed with lithium, such as silicon (Si), tin (Sn), or aluminum (Al), are being spotlighted as materials for replacing carbon-based anode electrode materials having a theoretical capacity of 372 mAh/g.

From among the non-carbon-based anode electrode materials, silicon exhibits the largest theoretical capacity of about 4,200 mAh/g, and thus utilization of silicon is very important in terms of capacity. However, volume of charged silicon is about 4 times greater than that of discharged silicon. Therefore, due to change of volume during charging and discharging operations, electric connection between active materials is destroyed, an active material is detached from a current collector, and an irreversible reaction deteriorating life expectancy of a battery, such as formation of a solid electrolyte interface (SEI) layer like a $Li_2O$ layer due to corrosion of the active material due to an electrolyte, occurs, and thus it is difficult to utilize silicon as a anode electrode material.

To overcome the problems, a method of fabricating a nano-size active material, a method of enhancing surfaces of an active material by using graphene or carbon, and a method of synthesizing materials having various structures have been suggested. Furthermore, a technique for resolving problems of a anode electrode based on charging/discharging operations by forming a plurality of grooves with semicircular cross sections or a plurality of hemispherical grooves by wet-etching a surface of a current collector foil or forming nano-wires grown to have first ends substantially fixed to a current collector foil on an upper portion of the current collector foil and depositing an active material thereto via a physical vapor deposition has been suggested. However, in this case, since an active material layer covering all of the nano-wires is formed, and thus the active material may be exfoliated and it is difficult to effectively increase a ratio of specific surface area to volume due to the nano-wires.

DISCLOSURE OF THE INVENTION

Technical Problem

The present invention provides an electrode for a secondary battery, the electrode for suppressing irreversibility based on change of volume during charging and discharging operations and effectively increasing a ratio of specific surface area to volume for commercialization of a new high capacity active material with a large volume expansion ratio.

The present invention also provides a method of fabricating an electrode for a secondary battery having the above-stated advantages.

Technical Solution

According to an aspect of the present invention, there is provided an electrode for a secondary battery, the electrode including a non-woven fabric current collector including metal fibers that form continuous porosity from a surface of the non-woven fabric current collector to the interior of the non-woven fabric current collector; and an active material layer deposited onto the metal fibers in a non-radial shape via the porosity in a plasma-based sputtering operation.

According to an embodiment, the active material layer deposited in the non-radial shape has a circularity, which is defined by Equation 1 below, from 0.2 to 0.8;

$$\text{Circularity} = \frac{2\sqrt{\pi A}}{P} \quad \text{[Equation 1]}$$

(A denotes an entire area of a cross-section of the metal fiber and the active material layer formed on the metal fiber, and P denotes circumferential length of the cross-section). The cross-section has an elliptical shape.

According to an embodiment, the active material layer is deposited from a surface of the non-woven fabric current collector to the interior of the non-woven fabric current collector. In this case, size of the porosity is equal to or larger than that of the sheath of the plasma. Size of the porosity is within a range from about 0.01 mm to about 2 mm.

According to an embodiment, diameter of the metal fiber is within a range from about 1 μm to about 200 μm. Furthermore, the metal or the metalloid is any one selected from a group consisting of tin (Sn), silicon (Si), antimony (Sb), zinc (Zn), germanium (Ge), aluminum (Al), copper (Cu), bismuth (Bi), cadmium (Cd), magnesium (Mg), cobalt (Co), arsenic (As), gallium (Ga), lead (Pb), and iron (Fe) or an inter-metallic compound.

The metal fiber is formed of a stainless steel, iron, aluminum, copper, nickel, chromium, titanium, vanadium, tungsten, manganese, cobalt, zinc, ruthenium, lead, iridium, antimony, platinum, silver, gold, or a compound thereof. The metal fibers are acid-cleaned to control surface roughness.

According to an aspect of the present invention, there is provided a method of fabricating an electrode for a secondary battery, the method including providing a non-woven fabric current collector including metal fibers, which form porosity, in a plasma reactor; providing a sputtering target including a metal, a metalloid, an oxide thereof, or a mixture thereof including an active material in the plasma reactor; and depositing an active material layer on the metal fibers in a non-radial shape via the porosity in a plasma-based sputtering operation.

According to an embodiment, the active material layer deposited in the non-radial shape has a circularity, which is defined by Equation 1 below, from 0.2 to 0.8;

$$\text{Circularity} = \frac{2\sqrt{\pi A}}{P} \quad [\text{Equation 1}]$$

(A denotes an entire area of a cross-section of the metal fiber and the active material layer formed on the metal fiber, and P denotes circumferential length of the cross-section).

The non-woven fabric current collector is levitated inside the plasma reactor, such that all surfaces facing the main surfaces of the non-woven fabric current collector are exposed to plasma. The active material layer is deposited from a surface of the non-woven fabric current collector to the interior of the non-woven fabric current collector. The interior of the plasma reactor includes an oxidizing atmosphere or a reducing atmosphere.

Size of the porosity is equal to or larger than that of the sheath of the plasma. According to an embodiment, size of the porosity is within a range from about 0.01 mm to about 2 mm. Diameter of the metal fiber is within a range from about 1 μm to about 200 μm.

The metal or the metalloid is any one selected from a group consisting of tin (Sn), silicon (Si), antimony (Sb), zinc (Zn), germanium (Ge), aluminum (Al), copper (Cu), bismuth (Bi), cadmium (Cd), magnesium (Mg), cobalt (Co), arsenic (As), gallium (Ga), lead (Pb), and iron (Fe) or an inter-metallic compound. The metal fiber is formed of a stainless steel, iron, aluminum, copper, nickel, chromium, titanium, vanadium, tungsten, manganese, cobalt, zinc, ruthenium, lead, iridium, antimony, platinum, silver, gold, or an compound thereof.

Advantageous Effects

According to an embodiment of the present invention, by depositing an active material layer onto metal fibers of a non-woven fabric current collector including the metal fibers, which form porosity, in a non-radial shape by operingusing a plasma-based sputtering, an electrode for suppressing tensile stress formed during operations for charging and discharging a high capacity active material with a large volume expansion ratio to suppress irreversibility, such as exfoliation of the active material, and to effectively increase a ratio of specific surface area to volume for increased energy density may be provided.

Furthermore, according to another embodiment of the present invention, a method of fabricating an electrode for a secondary battery, the binder-free method for dry-fabricating an electrode including a non-woven fabric current collector having formed thereon an active material layer in a non-radial shape may be provided.

MODE FOR CARRYING OUT THE INVENTION

Hereinafter, exemplary embodiments will be described in detail with reference to accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Furthermore, in the drawings, the thicknesses of layers and regions are exaggerated for clarity, and like reference numerals in the drawings denote like elements. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When applied to a lithium secondary battery, next generation anode electrode active materials, such as tin (Sn), silicon (Si), antimony (Sb), zinc (Zn), germanium (Ge), aluminum (Al), copper (Cu), bismuth (Bi), cadmium (Cd), magnesium (Mg), arsenic (As), gallium (Ga), lead (Pb), and iron (Fe), exhibit significant volume changes based on repeated charging and discharging operations. For example, in case of silicon anode electrode active material, a reaction that a $Li_xSi$ compound is formed based on an electrochemical reaction between lithium ions and the silicon anode electrode active material occurs from a surface of the silicon anode electrode active material. In this case, an acute interface is formed between pristine-Si and a lithium compound ($Li_xSi$) layer. As lithiation proceeds, the lithium compound ($Li_xSi$) layer becomes larger. When the entire silicon particles are changed to $Li_xSi$ compound, the electrochemical reaction is terminated.

A silicon interior layer not yet reacted during the lithiation and a lithium compound layer exists in a silicon anode electrode active material layer. As lithiation proceeds, tensile hoop stress is applied to the lithium compound layer at a certain time point at which the lithium compound layer surrounds silicon particles. The tensile hoop stress is the main reason of surface cracks and destruction of silicon particles.

However, since an anode electrode active material, such as a silicon, is more resistant to a compression stress than to a tensile stress, even if a compression stress that is 10 time or greater than a tensile hoop stress is applied, surface of an active material layer is barely cracked or broken. Therefore, the inventors of the present invention invented the present invention for preventing surface cracks of an anode electrode active material layer by preventing or minimizing application of a tensile hoop stress to surfaces thereof during a lithiation.

According to embodiments of the present invention, by suppressing and reducing the tensile hoop stress by controlling circularity of a cross-section of a anode electrode active material layer by using a sputtering method, formation of cracks based on volume expansion that occurs during lithiation and irreversible deterioration of life expectancy may be effectively enhanced. The embodiments below relate to an electrode for a secondary battery formed by depositing an active material layer with a large volume expansion ratio onto the metal fibers of a non-woven fabric current collector, which includes the metal fibers that form porosity by being atypically and 3-dimensionally arranged, via a sputtering operation and a method of fabricating the electrode.

In the present specification, a metal fiber refers to a linear structure formed by fiberizing a metal, such as a stainless steel, aluminum, nickel, titanium, copper, or an alloy thereof. The metal fiber exhibits characteristics of a metal, such as heat resistance, plasticity, and electroconductivity, and exhibits fibrous characteristics for a non-woven fabric processing operation. The present invention relates to characteristics and advantages for applying the characteristics of the metal fiber to an electrode structure of a battery.

The metal fibers may be fabricated by maintaining a metal or a compound in a suitable container in the form of a molten liquid and rapidly solidifying the molten liquid by jetting the molten liquid into the air through discharge holes of the container by using a compressed gas or a pressing device, such as a piston. Alternatively, the metal fibers may be fabricated by using a bundle drawing method known in the art. By controlling a number and size of the discharge holes and/or scattering of discharged molten metal, thickness, uniformity, tissue like non-woven fabric, and aspect ratio of metal fibers may be controlled. Metal fibers constituting a battery according to the present invention may include not only metal fibers fabricated by using the above-stated fabrication methods, but also metal fibers fabricated by using other methods known in the art, where the present invention is not limited thereto.

The term 'separator' used in the present specification includes a separator commonly used in a liquid electrode battery employing a liquid electrode exhibiting a small affination with respect to the separator. Furthermore, the 'separator' in the present specification also includes an intrinsic solid polymer electrolyte and/or a gel solid polymer electrolyte in which an electrolyte is strongly bound to the separator and the electrolyte and the separator are considered as a single element. Therefore, definition of the separator should be set forth as defined in the present specification.

Figure 1:
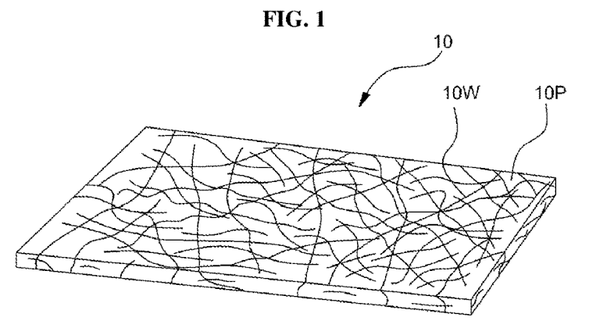
FIG. 1 is a perspective view of an entire non-woven fabric type current collector according to an embodiment of the present invention.

FIG. 1 is a perspective view of an entire non-woven fabric type current collector 10 according to an embodiment of the present invention Referring to FIG. 1, the non-woven fabric type current collector 10 includes a metal fiber 10W constituting porosity 10P. The metal fiber 10W may be segmented to have a suitable length and the plurality of metal fibers 10W may be arranged. According to embodiments of the present invention, lengths and a number of the metal fibers 10W may be suitably selected based on size and capacity of a battery. For example, the metal fiber 10W may have a thickness from about 1 μm to about 200 μm and a length from about 5 mm to about 1000 mm, and thus the metal fiber 10W may have an aspect ratio from about 25 to about 106.

For example, in case of the non-woven fabric type current collector 10 formed as a three-dimensional structure consisting of the metal fibers 10W having a diameter of 10 μm, surface area thereof is from about 13 $cm^2$ when the non-woven fabric type current collector 10 has a circular shape with a diameter of 12 mm, where the surface area of the non-woven fabric type current collector 10 is about 6 times greater than surface area of a metal thin-film current collector having a same weight (about 2 $cm^2$). Therefore, in relationship with an active material layer deposited thereon, a low-resistance interface is formed due to the increased area, and thus internal resistance thereof may be significantly reduced.

FIG. 1 shows that the metal fibers 10W have substantially linear shape and curved shapes. However, according to another embodiment of the present invention, the metal fiber 10W may also be formed to have any of various other regular or irregular shapes, such as a curled shape, a spiral-like shape, etc.

The metal fibers 10W are electrically connected to one another by being physically or chemically combined with one another, thereby forming a single conductive network. According to embodiments of the present invention, the metal fibers 10W may form a non-woven fabric structure by being randomly arranged and combined with one another as shown in FIG. 1. The metal fibers 10W are curved or bent and are tangled with one another, thereby forming a conductive network having porosity 10P with a low resistance, and a high mechanical strength. The porosity 10P may form a path in which a fluid may flow from a surface of the non-woven fabric type current collector 10 into the interior of the non-woven fabric type current collector 10.

The metal fiber 10W may be formed of a stainless steel, iron, aluminum, copper, nickel, chromium, titanium, vanadium, tungsten, manganese, cobalt, zinc, ruthenium, lead, iridium, antimony, platinum, silver, gold, or an alloy thereof and may preferably be any one of a stainless steel, iron, aluminum, copper, nickel, chromium, titanium, platinum, silver, gold, and an alloy thereof. According to an embodiment of the present invention, the metal fiber 10W may contain two or more different types of metals. According to embodiments of the present invention, the metal fibers 10W may be chemically combined with one another through formation of an inter-metallic compound between the two or more metals by performing an additional operation, such as a heat treatment. The metal fibers 10W may be acid-cleaned to increase surface roughness for improved adhesiveness to an active material layer.

Since the metal fibers 10W constituting the conductive network may be mechanically independent, capable of forming a structure, and function as a current collector by relying on one another, thus being distinguished from particle-like linear structures, such as nano-structures or carbon nanotubes linearly grown on a current collector foil in the related art.

Figure 2A:
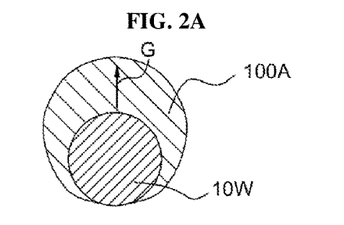
FIGS. 2A and 2B are diagrams showings cross-sectional structures of metal fibers having deposited thereon an active material layer and an active material layer according to embodiments of the present invention.
Figure 2B:
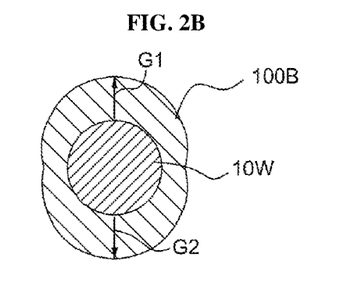

FIGS. 2A and 2B are diagrams showings cross-sectional structures of metal fibers 10W having deposited thereon the active material layer 100A and the active material layer 100B according to embodiments of the present invention.

Referring to FIG. 2A, the active material layer 100A may be formed as reactive species or ion species for an active material diffused or drifted through porosity (10P of FIG. 1) in a sputtering operation using plasma are deposited on the metal fibers 10W. Such a dry deposition operation is a binder-free operation, and thus reduction of internal resistance due to a binder and introduction of a conductive material may be eliminated.

The active material layer 100A may be formed on the metal fibers 10W from surfaces of a non-woven fabric type current collector (10 of FIG. 1) to the interior thereof. For the ion species to be sufficiently drifted to the interior of the non-woven fabric type current collector 10, size of porosity (diameter of a sphere that may be passed through the porosity) may be equal to or greater than a plasma sheath induced under reaction conditions of an active material layer during a sputtering operation. According to an embodiment of the present invention, size of the porosity 10P may be from about 0.01 mm to about 2 mm.

According to an embodiment of the present invention, deposition occurs by ion species that are accelerated by an electric field based on plasma in a constant direction, e.g., a direction from bulk plasma toward the non-woven fabric type current collector 10, the active material layer 100A is formed on the metal fibers 10W more smoothly along a particular direction. As indicated by the arrow G, the active material layer 100A formed on the metal fiber 10W to have greater thickness upward. The direction indicated by the arrow G may be a direction opposite to a direction of an electric field between plasma and the non-woven fabric type current collector 10.

Referring to FIG. 2B, the active material layer 100B formed on the metal fiber 10W is grown to have a cross-sectional shape having greater thickness in two opposite directions from the metal fiber 10W as indicated by the arrows G1 and G2. The active material layer 100B may be grown in two directions by rotating a direction in which the non-woven fabric type current collector 10 is arranged by 180 degrees during a sputtering operation for deposition of the active material layer 100B. Detailed descriptions thereof will be given below with reference to FIG. 3B.

As described above with reference to FIGS. 2A and 2B, the active material layers 100A and 100B are formed on the metal fibers 10W to have non-radial shapes. The non-radial shapes of the active material layers 100A and 100B may be evaluated based on circularity as defined by Equation 1 below. The circularity is determined as a ratio of an entire cross-sectional area of the active material layer 100A or 100B to a circumferential length of the active material layer 100A or 100B.

$$\text{Circularity} = \frac{2\sqrt{\pi A}}{P} \quad \text{[Equation 1]}$$

Here, A denotes an entire area of a cross-section of the metal fiber and the active material layer formed on the metal fiber, and P denotes circumferential length of the cross-section. The circularity may be measured from an image obtained from a scanning electron microscope by using commercial software like ImageJ®, e.g., Imagej136. Alternatively, the circularity may be measured by using a flow particle image analyzer like FPIA-3000® of SYSMEX Co. Ltd (Kobe, Japan).

The circularity may be within a range from about 0.2 to about 0.8. If the circularity is smaller than 0.2, micronization of an active material layer may begin from a region of thin deposition due to a plurality of charging and discharging operations, and thus life expectancy of the active material layer may be deteriorated. On the contrary, if the circularity exceeds 0.8, the active material layers 100A and 100B may be easily cracked or fractured due to tensile stresses applied to lithiated layers. Formation of a SEI layer on inner surfaces of the active material layer that are exposed by the crack or the fracture may be accelerated, thereby causing deterioration of life expectancy of a battery.

The active material may contain a metal, a metalloid, an oxide thereof, or a mixture thereof that electrochemically reacts with lithium ions via alloying/dealloying, occlusion/release, absorption/desorption, or a combination thereof of the lithium ions. For example, the metal or the metalloid may be any one selected from a group consisting of tin (Sn), silicon (Si), antimony (Sb), zinc (Zn), germanium (Ge), aluminum (Al), copper (Cu), bismuth (Bi), cadmium (Cd), magnesium (Mg), cobalt (Co), arsenic (As), gallium (Ga), lead (Pb), and iron (Fe) or an inter-metallic compound. However, the above-stated materials are merely examples, and the present invention is not limited thereto.

Figure 3A:
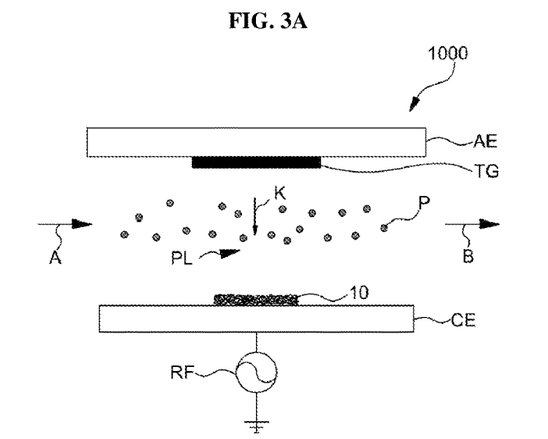
FIGS. 3A and 3B are diagrams showing methods of forming electrodes using sputtering, according to embodiments of the present invention.
Figure 3B:
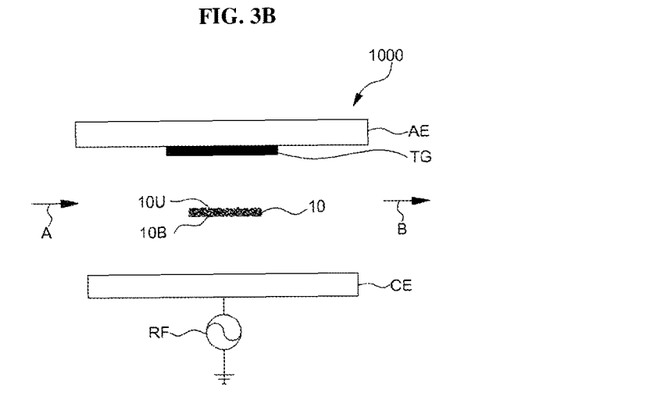

FIGS. 3A and 3B are diagrams showing methods of forming electrodes using sputtering, according to embodiments of the present invention.

Referring to FIG. 3A, a plasma reactor 1000 may be a capacitively coupled reactor including an anode AE and a cathode CE. A sputtering target TG is arranged inside the plasma reactor 1000. The sputtering target TG may be a plastic body or a sintered body of a metal, a metalloid, an oxide, or a mixture thereof including the above-stated active material. The non-woven fabric type current collector 10 may be arranged to face the sputtering target TG. An inert discharging gas, such as argon gas, is introduced into the plasma reactor 1000 (arrow A) at a controlled flux and the interior of the plasma reactor 1000 is exhausted, thereby maintaining the interior of the plasma reactor 1000 at a constant pressure. According to some embodiments, a reactive gas, such as an oxidizing gas (e.g., oxygen gas or ozone gas) or a reducing gas (e.g., nitrogen gas or hydrogen gas), may be further supplied. Next, when an alternated power supply RF electrically combined with the cathode CE is turned on, a gas discharge is induced inside the plasma reactor 1000, and thus plasma PL is formed.

The plasma PL forms an electric field in a direction from the anode AE toward the cathode CE as indicated by the arrow K, and clusters, neutral species, or ion species of an active material desorbed from the sputtering target TG are transferred toward the non-woven fabric type current collector 10 and deposited onto metal fibers (10W of FIG. 1) of the non-woven fabric type current collector 10. Linearity of the clusters, the neutral species, or the ion species may be controlled by adjusting flux, pressure, power intensity, and an interval between electrodes inside the plasma reactor 1000, and thus circularity of an active material layer deposited onto metal fibers may be controlled. If the linearity increases, the circularity may decrease, and vice versa. Furthermore, according to an embodiment of the present invention, if size of porosity of the non-woven fabric type current collector 10 is equal to or greater than that of the sheath of the plasma PL, linearity of ion species may be maximized, and thus circularity may be reduced.

Referring to FIG. 3B, the non-woven fabric type current collector 10 may be levitated inside the plasma reactor 1000, such that the main surfaces of the non-woven fabric type current collector 10, that is, the upper surface 10U and the lower surface 10B facing each other are exposed to the plasma PL. To this end, a supporting member for fixing an end of the non-woven fabric type current collector 10 may be provided inside the plasma reactor 1000.

In the method of fabricating an electrode using sputtering according to the present invention, although not limited, working pressure inside the plasma reactor 1000 is within a range from about $10^{-3}$ Torr to about $10^{-7}$ Torr, may be within a range from about $10^{-4}$ Torr to about $10^{-6}$ Torr, and may preferably be about $10^{-6}$ Torr. Generally, in a sputtering operation, as the working pressure increases, scatterings of neutral species, ion species, and reactive species increase, and thus an electrode with uniformly formed contacts may be formed. However, if the working pressure exceeds $10^{-3}$ Torr, sputtered ions are excessively scattered. As a result, density of ion species becomes excessively high during deposition, and thus thermodynamic energy may be lost. Incidentally, if the working pressure is lower than $10^{-7}$ Torr, ions may not be sufficiently scattered, and thus an active material based on a metal, an active material based on a metal oxide, or a mixture thereof may not be sufficiently deposited.

During the sputtering operation, although not limited, a working temperature of a non-woven fabric type current collector is within a range from about 0° C. to about 200° C., may be within a range from about 10° C. to about 90° C., and may preferably be within a range from about 10° C. to about 80° C.

Furthermore, during the sputtering operation according to the present invention, although not limited, flux of introduced argon gas is within a range from about 10 $cm^3$/min to about 50 $cm^3$/min, may be within a range from about 2 $cm^3$/min to about 30 $cm^3$/min, and may preferably be from about 5 $cm^3$/min to about 20 $cm^3$/min.

Although the above-stated plasma reactor relates to a capacitively coupled reactor, it is merely an example, and the present invention is not limited thereto. For example, the plasma reactor may have another plasma source, such as an inductively coupled plasma source, a magnetron plasma source, and an electromagnetic resonance, and, if necessary, may include a remote plasma source.

Figure 4A:
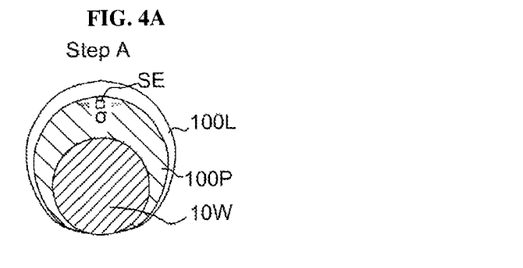
FIGS. 4A to 4C are diagrams showing stages of growth of a lithiated layer that an active material formed on a metal fiber in a non-radial shape experiences as being lithiated during a charging operation according to an embodiment of the present invention.
Figure 4B:
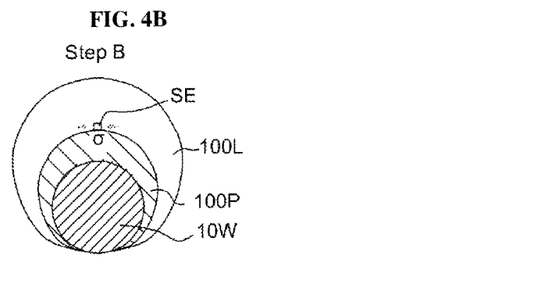
Figure 4C:
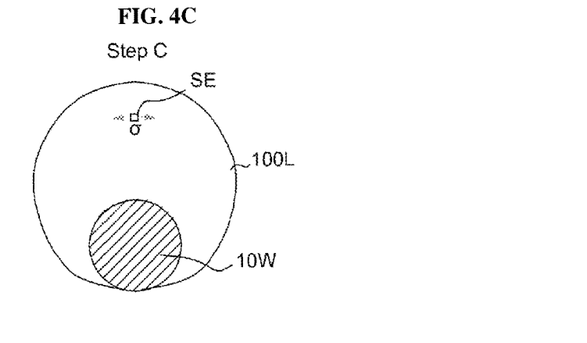
Figure 4D:
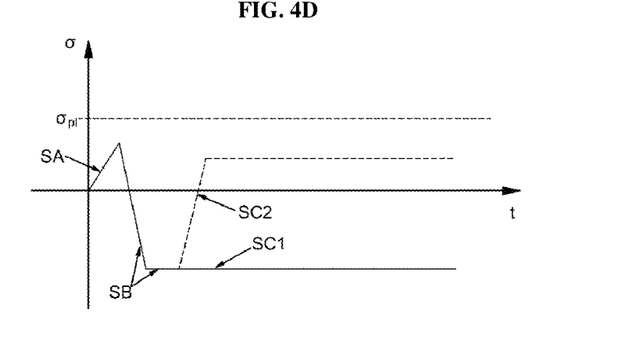
FIG. 4D is a graph showing change of stresses in the respective stages of growth.

FIGS. 4A to 4C are diagrams showing stages of growth of a lithiated layer 100L that an active material formed on a metal fiber in a non-radial shape experiences as being lithiated during a charging operation according to an embodiment of the present invention, and FIG. 4D is a graph showing change of stresses in the respective stages of growth. The horizontal axis indicates charging times corresponding to lithium insertion, whereas the vertical axis indicates stresses.

Referring to FIGS. 4A to 4C, considering a stage A in which lithiation begins on a surface of an active material layer with a circularity from 0.2 to 0.8, a representative stress element SE located in an active material layer core 100P that is not yet lithiated experiences small tensile stress due to the expanding lithiated layer 100L. As lithiation proceeds as in a stage B, compression stress is applied to the representative stress element SE located in front of lithiation moving toward the active material layer core 100P. However, even the lithiation proceeds to a stage C, compression stress is still applied to the representative stress element SE located in the lithiated layer 100L, where the corresponding region is a region at which the lithiated layer 100L still experiences an elastic behavior with respect to the compression stress. Therefore, no crack or fracture occurs in the lithiated layer.

Referring to FIG. 4D, the dominant stress change in the active material layer shown in the graph includes tensile stress SA in the stage A and compression stress SB in the stage B. In the stage C where the lithiated layer 100L is dominant, compression stress SC1 or subtle tensile stress SC2 is applied.

At a circularity from 0.2 to 0.8, compression stress σcomp is applied to a surface of the lithiated layer 100L on the active material layer core 100P. Under the compression stress σcomp, the lithiated layer 100L is a region experiencing an elastic behavior, and thus no crack or fracture occurs in the lithiated layer 100L. Even if lithium ions Li+ are omnidirectionally transferred to a surface of an active material layer via an electrolyte absorbed through porosity and the lithiated layer 100L grows as a shell, magnitude of tensile hoop stress applied to the shell may be reduced or eliminated throughout the shell due to the compression stress σcomp due to the interface between flat surface elements based on a controlled circularity. Therefore, formation of a crack on a surface of the lithiated layer 100L may be suppressed.

Figure 5A:
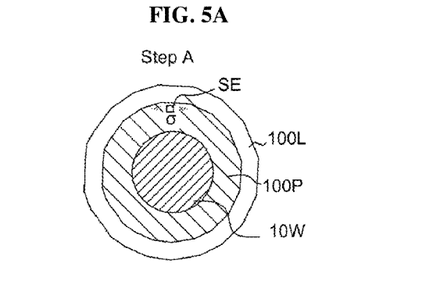
FIGS. 5A to 5C are diagrams showing stages of growth of a lithiated layer that an active material formed on a metal fiber in a radial shape experiences as being lithiated during a charging operation according to a comparative embodiment.
Figure 5B:
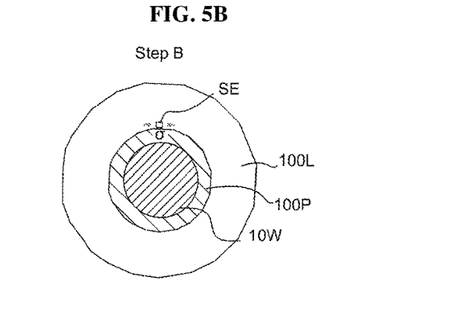
Figure 5C:
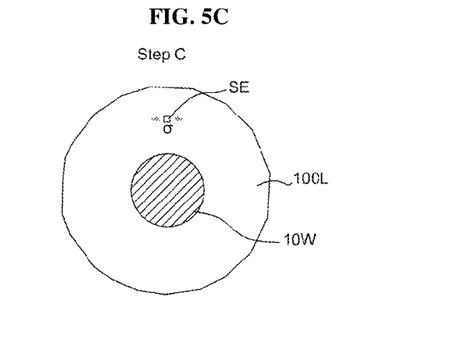
Figure 5D:
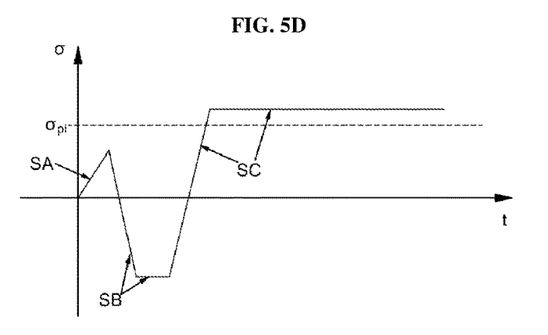
FIG. 5D is a graph showing change of stresses in the respective stages of growth. The horizontal axis indicates charging times corresponding to lithium insertion, whereas the vertical axis indicates stresses.

FIGS. 5A to 5C are diagrams showing stages of growth of a lithiated layer 100L that an active material formed on a metal fiber in a radial shape experiences as being lithiated during a charging operation according to a comparative embodiment, and FIG. 5D is a graph showing change of stresses in the respective stages of growth. The horizontal axis indicates charging times corresponding to lithium insertion, whereas the vertical axis indicates stresses.

Referring to FIGS. 5A to 5C and FIG. 5D, in a stage A where lithiation begins on a surface of an active material layer according to the comparative embodiment of which circularity is substantially 1, a representative stress element SE located in an active material layer core 100P that is not yet lithiated experiences small tensile stress due to the expanding lithiated layer 100L as in the above embodiment of the present invention. Furthermore, as lithiation proceeds as in a stage B, compression stress is applied to the representative stress element SE located in front of lithiation moving toward the active material layer core 100P. However, in a stage C, as elastic deformation is gradually removed at the representative stress element SE located in the lithiated layer 100L, the lithiated layer 100L dominantly grows in a radial shape (or, in radial directions), thereby inducing hoop stress of tensile stress equal to or greater than critical tensile stress σplastic. As a result, a surface of the lithiated layer 100L weakened due to volume expansion is cracked or fractured.

According to an embodiment of the present invention, an active material layer is formed to have a reduced circularity from about 0.2 to about 0.8, where the formation thereof may be easily controlled by using a plasma-based dry deposition method. By using an electrode including a non-woven fabric type current collector consisting of such a non-radial active material layer and metal fibers, irreversible reactions based on cracks or fractures of silicon particles that occurs during charging of a battery may be suppressed or reduced.

Figure 6:
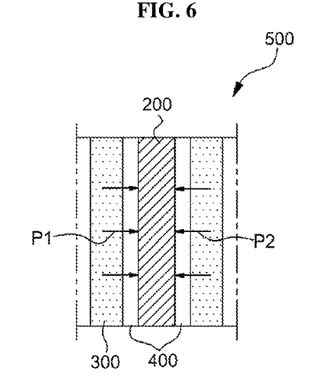
FIG. 6 is a sectional view for describing an electrochemical reaction of a battery cell 500 employing an electrode according to an embodiment of the present invention.

FIG. 6 is a sectional view for describing an electrochemical reaction of a battery cell 500 employing an electrode according to an embodiment of the present invention.

Referring to FIG. 6, electrodes with different polarities including an anode electrode 200 and a cathode electrode 300 may be stacked to form the battery cell 500. Conductive tabs (not shown) may be attached to first ends of the electrodes 200 and 300. For insulation between the anode electrode 200 and the cathode electrode 300, a separator 400, such as a polymer-based micro-porous film, a woven fabric, a non-woven fabric, a ceramic, an intrinsic solid polymer electrolyte film a gel solid polymer electrolyte film, or a combination thereof, may be arranged between the electrodes 200 and 300. As an unlimited example, in the battery cell 500, an electrode containing a salt, such as potassium hydroxide (KOH), potassium bromide (KBr), potassium chloride (KCL), zinc chloride (ZnCl2), and sulfuric acid H2SO4 may be absorbed to the electrodes 200 and 300 and/or the separator 400, and thus the battery cell 500 may be completed.

An electrode including a non-woven fabric current collector and an active material stacked on metal fibers thereof in a non-radial shape according to the above-stated embodiment may be applied as any one of or both the cathode electrode 300 and the anode electrode 200. Preferably, an electrode according to an embodiment of the present invention may be applied as the anode electrode 200. FIG. 6 shows an embodiment in which an electrode according to an embodiment of the present invention is applied as the anode electrode 200.

During a charging operation or a discharging operation, the anode electrode 200 may perform ion exchanges as indicated by the arrow by utilizing both the cathode electrode 300 facing the anode electrode 200 and the both main surfaces of the anode electrode 200. For example, in the battery cell 500, the two cathode electrodes 300 may share the single-layer anode electrode 200. Therefore, while the battery cell 500 is being charged, all of lithium ions of the cathode electrodes 300 move toward the both surfaces of the anode electrode 200 as indicated by the arrows P1 and P2. Incidentally, while the battery cell 500 is being discharged, lithium ions move toward the cathode electrodes 300 in directions respectively opposite to the directions indicated by the arrows P1 and P2.

According to an embodiment of the present invention, compared to an electrode structure including a metal foil current collector coated with an electrically active material, a smaller number of separators are employed, and thus energy density may be increased.

Furthermore, since the non-woven fabric type electrode consisting of metal fibers and an active material combined with the same may maintain fibrous characteristics, the non-woven fabric current collector may be easily deformed. Furthermore, since a substantially uniform conductive network is formed throughout the electrode, even if thickness of the electrode is increased to control capacity of a battery, internal resistance does not increase unlike as in a conventional battery structure obtained by coating an active material layer onto a metal foil. Therefore, charging and discharging efficiencies may be maintained or improved, and thus a high capacity battery may be provided.

Furthermore, due to ease of deformation or elastic characteristics based on fibrous characteristics of an electrode according to an embodiment of the present invention, the electrode may not only be formed as a wound type, but also be 3-dimensionally deformed by being stacked, bent, and wound, and thus the electrode may be applied to batteries having shapes other than a cylindrical shape, e.g., a hexahedral shape, a pouch-like shape, etc., or batteries having any of various volumes and shapes to be integrated with fabric products like clothes and bags. Furthermore, an electrode according to an embodiment of the present invention may be applied to a flexible battery with excellent bending characteristics for wearable devices.

Hereinafter, detailed embodiments of the present invention will be given below. However, the embodiments described below are disclosed merely as examples of the present invention, and the present invention is not limited thereto.

First Embodiment

Figure 7:
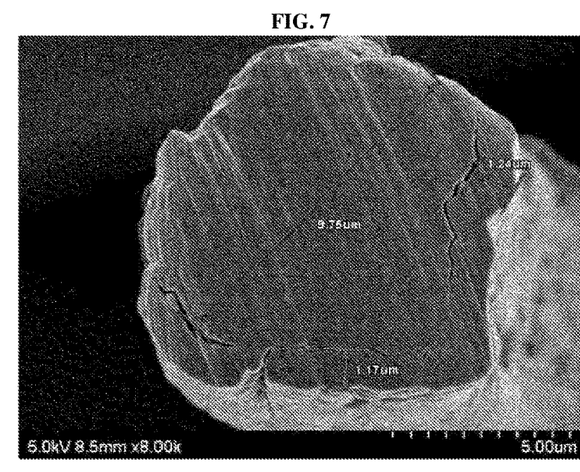
FIG. 7 is a diagram showing a silicon active material layer deposited onto the metal fiber in a non-radial shape.

A non-woven fabric current collector including metal fibers, which are formed of an alloy of iron, nickel, and chromium and have an average diameter of 10 μm, was arranged at a location inside a plasma reactor, and a sputtering target formed of silicon was arranged at another location inside the plasma reactor to face the non-woven fabric current collector. A plasma source for deposition of an active material layer was based on RF capacitive coupling, a working temperature was $10^{-6}$ Torr, a working temperature was 25° C., and a working time was 2 hours, where a anode electrode including the non-woven fabric current collector having deposited thereon a silicon layer was fabricated by injecting argon gas at the flux of 15 cm³/min. FIG. 7 is a diagram showing a silicon active material layer 100 deposited onto the metal fiber 10W in a non-radial shape. Here, circularity of the silicon active material layer 100 was within a range from 0.2 to 0.8, that is, about 0.46.

A battery was fabricated in a glove box with the argon gas atmosphere by using the electrode fabricated as described above and electrochemical characteristics of the battery were evaluated.

First Comparative Embodiment

An electrode and a battery were fabricated under the same conditions using the same method as those of the first embodiment except that a copper thin-film current collector having a same size was employed instead of the non-woven fabric current collector consisting of metal fibers formed of an alloy of iron, nickel, and chromium, and electrochemical characteristics of the battery were evaluated.

Figure 8A:
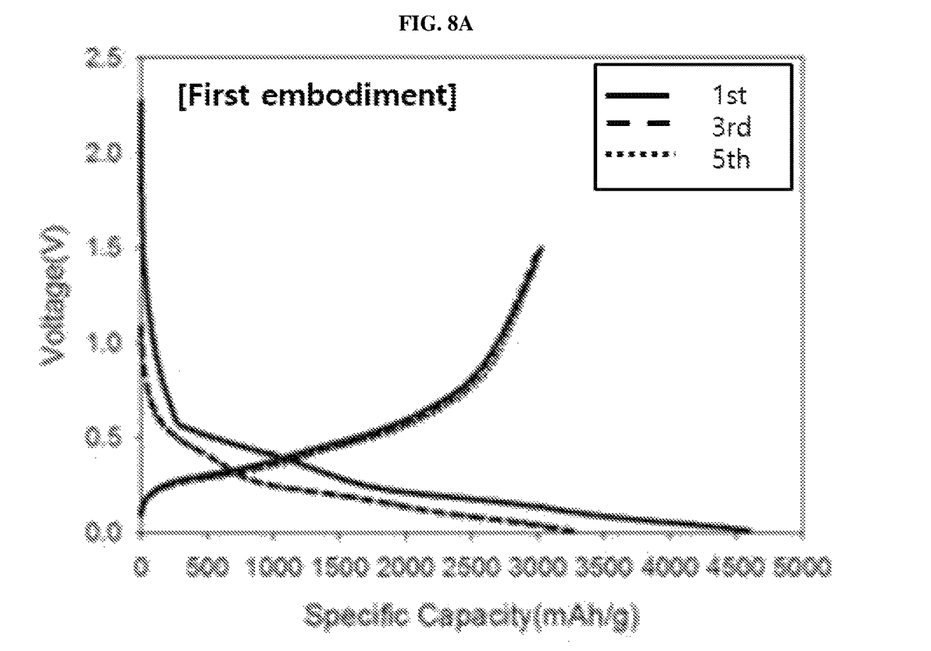
FIGS. 8A and 8B are graphs showing discharging characteristics measured by applying constant currents of 300 mA/g to the battery according to the first embodiment and the battery according to the first comparative embodiment, respectively.
Figure 8B:
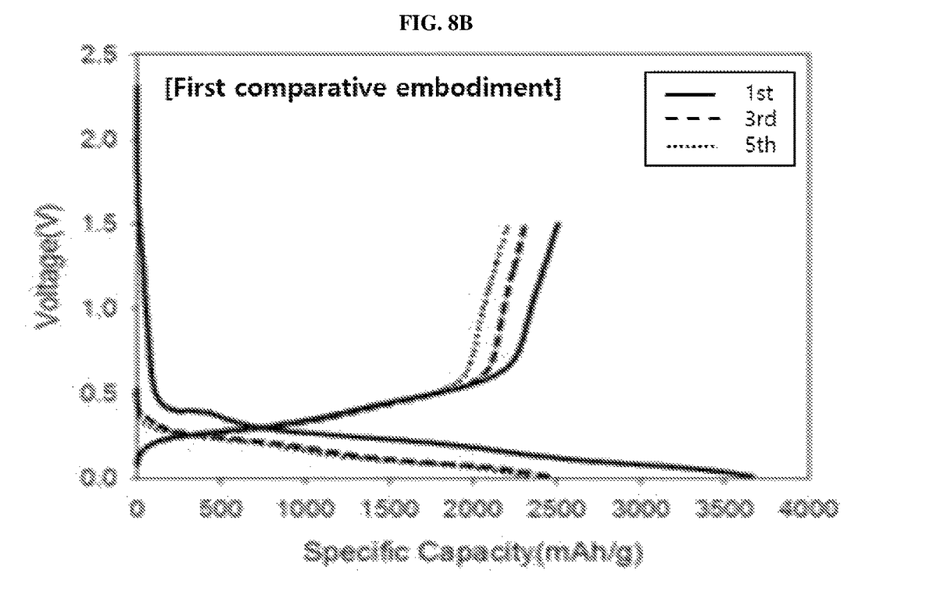

For evaluation of characteristics of the batteries, discharging characteristics measured by applying constant currents of 300 mA/g to the battery according to the first embodiment and the battery according to the first comparative embodiment are shown in FIGS. 8A and 8B, respectively.

Referring to FIGS. 8A and 8B, battery capacity of the battery according to the first embodiment was more than 1.4 times greater than that of the battery according to the first comparative embodiment. Furthermore, in case of the battery fabricated according to the first embodiment, discharge amount of 3000 mAh/g was maintained well even if the battery was charged and discharged 5 times. However, in case of the battery fabricated according to the first comparative embodiment, discharge amount was reduced from 2,500 mAh/g to 2,300 mAh/g as the battery was charged and discharged once (1st), three times (3rd), and five times (5th).

Figure 9:
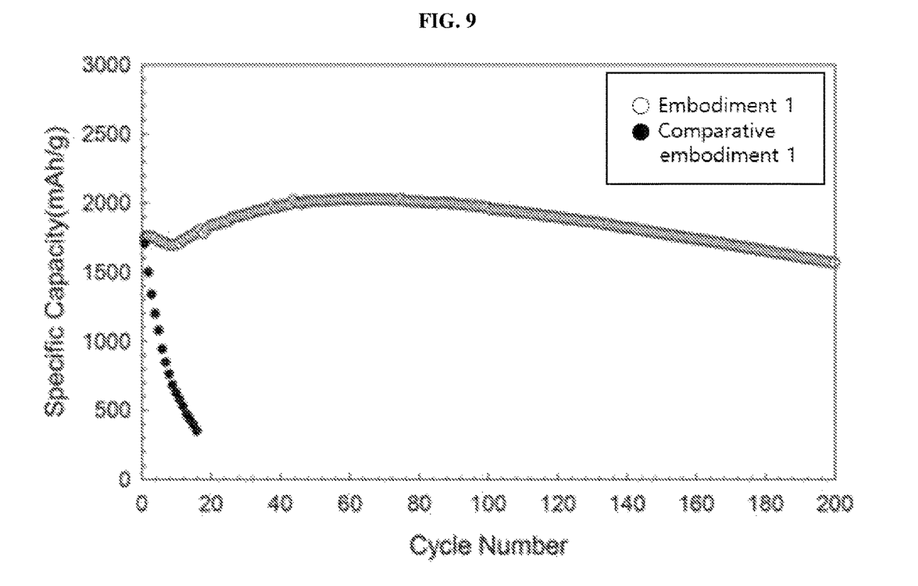
FIG. 9 is a graph showing a result of evaluating life expectancy characteristics of the battery according to the first embodiment and the battery according to the first comparative embodiment after being charged and discharged 200 times by applying currents of 2,000 mA/g thereto.

Furthermore, for evaluation of life expectancy characteristics of the batteries, each of the battery according to the first embodiment and the battery according to the first comparative embodiment was charged and discharged 200 times by applying currents of 2,000 mA/g thereto, and results thereof are shown in FIG. 9. Referring to FIG. 9, in case of the battery according to the first embodiment, capacity of the battery after being charged and discharged was maintained to 90% of the initial capacity thereof. Incidentally, capacity of the battery according to the first comparative embodiment was significantly reduced before being charged and discharged 10 times.

Figure 10A:
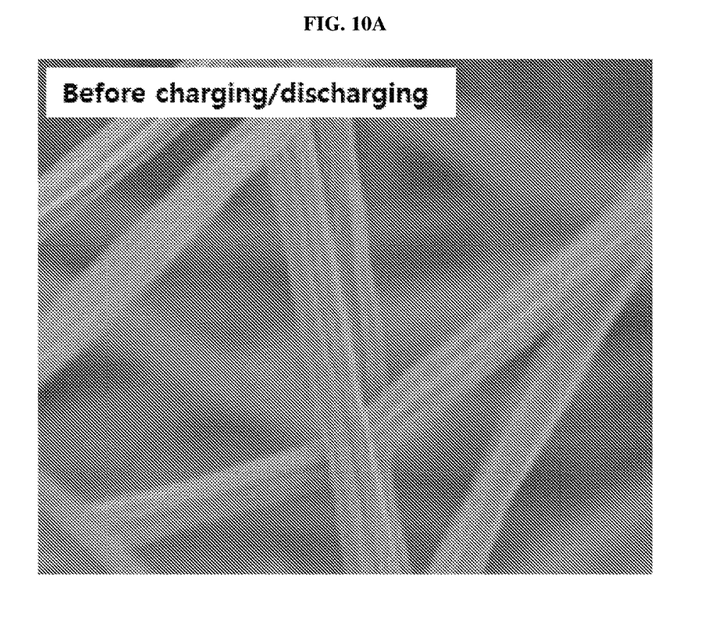
FIGS. 10A and 10B are scanning electron microscope images of the battery according to the first embodiment before being charged/discharged and after being charged/discharged.
Figure 10B:
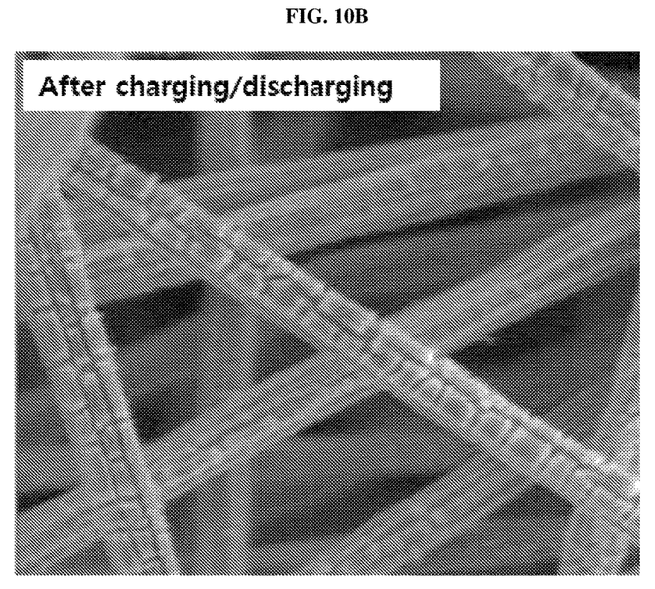
Figure 11:
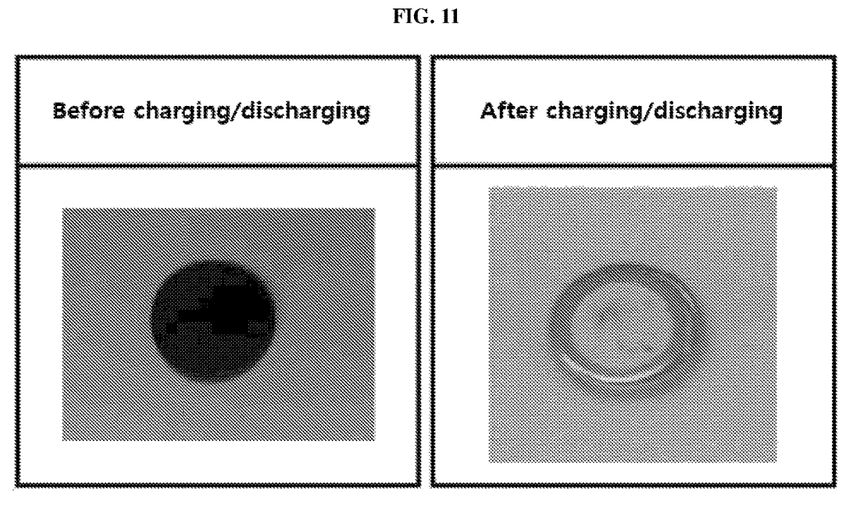
FIG. 11 is an optical image of the battery according to the first comparative embodiment before being charged/discharged and after being charged/discharged.

FIGS. 10A and 10B are scanning electron microscope images of the battery according to the first embodiment before being charged/discharged and after being charged/discharged. Referring to FIGS. 10A and 10B, an active material layer was well maintained without an exfoliation in the battery according to the first embodiment. FIG. 11 is an optical image of the battery according to the first comparative embodiment before being charged/discharged and after being charged/discharged. Referring to FIG. 11, unlike the battery according to the first embodiment, an electrode layer is exfoliated from a current collector as the battery was charged and discharged.

Second Embodiment

An electrode and a battery were fabricated under the same conditions using the same method as those of the first embodiment except that a $Fe_2O_3$ active material was used instead of a silicon active material, and electrochemical characteristics of the battery were evaluated.

Second Comparative Embodiment

An electrode and a battery were fabricated under the same conditions using the same method as those of the first embodiment except that a copper thin-film current collector having a same size was employed, and electrochemical characteristics of the battery were evaluated.

As a result, in case of the battery according to the second embodiment, capacity of the battery after being charged and discharged 200 times was maintained to 90% of the initial capacity thereof. Incidentally, capacity of the battery according to the second comparative embodiment was significantly reduced before being charged and discharged 10 times. Furthermore, shape of the battery according to the second embodiment was well maintained compared to the initial shape of the battery. However, in the battery according to the second comparative embodiment, an electrode layer is exfoliated from a current collector as the battery was charged and discharged.

Third Embodiment

An electrode and a battery were fabricated under the same conditions using the same method as those of the first embodiment and the second embodiment except that active material layers were deposited for 0.5 hours, 2 hours, and 10 hours to evaluate characteristics of the battery, evaluate life expectancy characteristics of the battery, and check changes of shape of the electrode according to working times, and electrochemical characteristics of the battery were evaluated under the same condition as those in the first embodiment and the second embodiment.

As a result, in case of the battery according to the third embodiment, capacity maintained after charging and discharging the battery 200 times gradually decreased as the working time of the sputtering operation increased. Particularly, when an active material was deposited for 2 hours or less, about 90% of the initial capacity was maintained. However, when an active material was deposited for 10 hours, about 10% of the initial capacity was maintained (refer to Table 1). The reason thereof is that, since working time for deposition of an active material increases, an amount of deposited active material increases, and thus volume expansion at the lower portion of the deposited active material may not be effectively buffered. As a result, it is difficult to maintain capacity.

TABLE 1

|  | Si Active Material | | $Fe_2O_3$ Active Material | |
| --- | --- | --- | --- | --- |
|  | Initial Capacity ($mAhcm^{-2}$) | After 200 Cycles ($mAhcm^{-2}$) | Initial Capacity ($mAhcm^{-2}$) | After 200 Cycles ($mAhcm^{-2}$) |
| 0.5 Hours | 0.088 | 0.087 | 0.059 | 0.057 |
| 2 Hours | 0.354 | 0.318 | 0.209 | 0.183 |
| 10 Hours | 1.770 | 1.181 | 1.138 | 0.147 |

While the present invention has been particularly shown and described with reference to embodiments thereof, it will be understood by those of ordinary skill in the art that various changes in form and details may be made therein without departing from the spirit and scope of the present invention as defined by the following claims

INDUSTRIAL APPLICABILITY

According to an embodiment of the present invention, by depositing an active material layer onto metal fibers of a non-woven fabric current collector including the metal fibers, which form porosity, in a non-radial shape by operingusing a plasma-based sputtering, an electrode for suppressing tensile stress formed during operations for charging and discharging a high capacity active material with a large volume expansion ratio to suppress irreversibility, such as exfoliation of the active material, and to effectively increase a ratio of specific surface area to volume for increased energy density may be provided.

Furthermore, according to another embodiment of the present invention, a method of fabricating an electrode for a secondary battery, the binder-free method for dry-fabricating an electrode including a non-woven fabric current collector having formed thereon an active material layer in a non-radial shape may be provided.

The invention claimed is:
1. A method of fabricating an electrode for a secondary battery comprising:

providing, into a plasma reactor, a non-woven fabric current collector comprising metal fibers which form a porosity;

providing, into the plasma reactor, a sputtering target comprising a metal, a metalloid, an oxide thereof, or a mixture thereof comprising an active material; and depositing an active material layer of a non-radial shape on the metal fibers through the porosity using a plasma-based sputtering operation, wherein a cross-section of the metal fiber and the active material deposited on the metal fiber, taken in a direction which is perpendicular to a longitudinal axis of the metal fiber, has a circularity from 0.2 to 0.8 as defined by Equation 1 below;

$$\text{Circularity} = \frac{2\sqrt{\pi A}}{P} \quad \text{[Equation 1]}$$

(A denotes an entire area of a cross-section of the metal fiber and the active material layer formed on the metal fiber, and P denotes circumferntial length of the cross-section), and wherein the circularity of the active material layer is controlled by a straight movement of clusters, neutral species, or ion species of the active material desorbed from the sputtering target.

2. The method of claim 1, wherein the non-woven fabric current collector is disposed between an anode and a cathode inside the plasma reactor, such that an upper surface and a lower surface of the non-woven fabric current collector are exposed to plasma.

3. The method of claim 1, wherein the active material layer is deposited from a surface of the non-woven fabric current collector to an interior of the non-woven fabric current collector.

4. The method of claim 1, wherein an interior of the plasma reactor comprises an oxidizing atmosphere or a reducing atmosphere.

5. The method of claim 1, wherein a pore size of the porosity is equal to or larger than that of a sheath of the plasma.

6. The method of claim 1, wherein a pore size of the porosity is within a range from about 0.01 mm to about 2 mm.

7. The method of claim 1, wherein a diameter of the metal fiber is within a range from about 1 μm to about 200 μm.

8. The method of claim 1, wherein the metal or the metalloid is any one selected from a group consisting of tin (Sn), silicon (Si), antimony (Sb), zinc (Zn), germanium (Ge), aluminum (Al), copper (Cu), bismuth (Bi), cadmium (Cd), magnesium (Mg), cobalt (Co), arsenic (As), gallium (Ga), lead (Pb), and iron (Fe) or an inter-metallic compound.

9. The method of claim 1, wherein the metal fiber is formed of a stainless steel, iron, aluminum, copper, nickel, chromium, titanium, vanadium, tungsten, manganese, cobalt, zinc, ruthenium, lead, iridium, antimony, platinum, silver, gold, or an alloy thereof.

10. The method of claim 1, wherein in response to linearity of the straight movement increasing, the circularity decreases, and in response to linearity of the straight movement decreasing, the circularity increases.

11. A method of fabricating an electrode for a secondary battery comprising:

providing, into a plasma reactor, a non-woven fabric current collector comprising metal fibers which form a porosity;

providing, into the plasma reactor, a sputtering target comprising a metal, a metalloid, an oxide thereof, or a mixture thereof comprising an active material; and depositing an active material layer of a non-radial shape on the metal fibers through the porosity using a plasma-based sputtering operation, wherein a cross-section of the metal fiber and the active material deposited on the metal fiber, taken in a direction which is perpendicular to a longitudinal axis of the metal fiber, has a circularity which is less than 1 as defined by Equation 1 below;

$$\text{Circularity} = \frac{2\sqrt{\pi A}}{P} \quad \text{[Equation 1]}$$

(A denotes an entire area of a cross-section of the metal fiber and the active material layer formed on the metal fiber, and P denotes circumferential length of the cross-section).

* * * * *